United States Patent [19]

Conrath

[11] Patent Number: 4,801,854
[45] Date of Patent: Jan. 31, 1989

[54] ADJUSTMENT AND DIALOGUE DEVICE MORE PARTICULARLY FOR SPEED VARIATORS

[75] Inventor: Christian Conrath, Rueil Malmaison, France

[73] Assignee: La Telemecanique Electrique, France

[21] Appl. No.: 85,685

[22] Filed: Aug. 14, 1987

[30] Foreign Application Priority Data

Aug. 14, 1986 [FR] France .................. 86 11739

[51] Int. Cl.⁴ .............................................. H02P 5/00
[52] U.S. Cl. ..................... 318/305; 318/663; 364/188; 364/140; 364/146
[58] Field of Search ......... 318/305, 308–311, 318/336, 560–561, 663; 364/140–146, 188

[56] References Cited

U.S. PATENT DOCUMENTS

| | | | |
|---|---|---|---|
| 4,317,776 | 2/1982 | Saar et al. ............................ | 318/305 |
| 4,425,630 | 1/1984 | Yomogida et al. .................. | 364/146 |
| 4,514,798 | 4/1985 | Lesche et al. ....................... | 364/146 |
| 4,658,348 | 4/1987 | Flanagan ............................. | 364/146 |
| 4,678,184 | 7/1987 | Neiger et al. ....................... | 272/129 |

*Primary Examiner*—William M. Shoop, Jr.
*Assistant Examiner*—David Martin
*Attorney, Agent, or Firm*—William A. Drucker

[57] ABSTRACT

An adjustment and dialogue device, more particularly for speed variators comprises potentiometers for adjusting the operating parameters of the variator, a unit displaying these parameters, an advance knob for successively displaying these parameters, a processor whose inputs are connected to the advance knobn and to the potentiometers via a converter and whose outputs are connected to the display unit, and a support being one part of a printed circuit control card located in a casing whose front face has a removable part which can be opened by the user.

3 Claims, 2 Drawing Sheets

ADJUSTMENT AND DIALOGUE DEVICE MORE PARTICULARLY FOR SPEED VARIATORS

BACKGROUND OF THE INVENTION

The present invention relates to an adjustment and dialogue device for an electronic power control apparatus such as a speed variator.

Electronic speed variators are widely used in association with DC or AC motors for driving these variable speed motors.

The use in a speed variator of a display device or else of one or more light emitting diodes is known for displaying, for example, an operating condition and a fault condition of the variator. However, such display is limited and does not allow the operator to undertake a dialogue or to carry out a continuous adjustment of parameters closely related to the operation of the variator.

It is in fact desirable to be able to readily and continuously adjust parameters such as acceleration and deceleration ramps, the high and low speed stops, the voltage/frequency law in the case of a frequency converter, etc... and to display the values of these parameters.

The use of a dialogue terminal may be considered for this purpose, but that requires a specific connection and forms a complementary apparatus separate from the speed variator.

It is an object of the invention to allow adjustment of the main operating parameters of an electronic power control apparatus such as a speed variator, using simple means integrated in the variator and readily accessible, while not allowing operations which would lead to untimely disturbances.

Another object is to facilitate the dialogue with the operator and so that this latter, through the display means used for the adjustment, can examine other non adjustable operating data or detect operating defects of the speed variator.

SUMMARY OF THE INVENTION

In accordance with the invention, an adjustment and dialogue device is associated with the electronic power apparatus and includes a fixed support disposed in the variator and having, on the one hand, means for adjusting the respective operating parameters of the variator and, on the other hand, an alphanumeric display device for displaying the effective values of respective parameters; at least one advance knob allowing the operator to sequentially examine the respective parameters; a processor having inputs connected both to the advance knob and to the adjusting means via at least an A-D converter for the outputs signals of the display device, and processing means adapted for monitoring the inputs and displaying on the display device, in response to actuation of the advance knob, a code representative of the scrutinized parameter and/or the value of this parameter; the support forming a part of a printed circuit control card housed in a housng of the speed variators, said housing having on the front face a removable part which may be opened by the operator for giving him access to the support.

The operator may then adjust the parameters considered without requiring an additional apparatus since the support is integrated with the variator.

Preferably, the advance knob is accessible and the display unit readable when the removable part of the housing is closed, so that the operator may cause scrolling of the codes and the values of the different parameters for reading thereof without being able to proceed with the adjustment. The adjusting means and other switches acting on the operation, the dialogue and the self-testing of the variator are occulted when the removable part of the housing is closed. The display sequence of the non-adjustable parameters precedes or follows the display sequence of the adjustable parameters.

The processing means may include a means for sequential scrutinization of the inputs connected to the adjusting means such as potentiometers or software means associated with a ROM as a function of the successive actuation or actuations of the advance knob, and storage and display control means for determining in response to the actuation or to each actuation of the knob the display on the display unit of a code representative of the scrutinized parameter and the value of this parameter.

The storage and display control means are preferably adapted for displaying on the display unit codes representative of non adjustable states or parameters and priority display of operation defects (by appropriate interruption means), even of hardware operation defects following a voluntary self-testing procedure. The processing means can be arranged for determining at each actuation of the knob the display of the parameter code, then the value of this parameter.

BRIEF DESCRIPTION OF THE DRAWINGS

Other advantages and features of the invention will be clear from reading the following description of one embodiment, with reference to the accompanying Figures, in which.

DESCRIPTION OF THE PREFERRED EMBODIMENT

Figure 1:
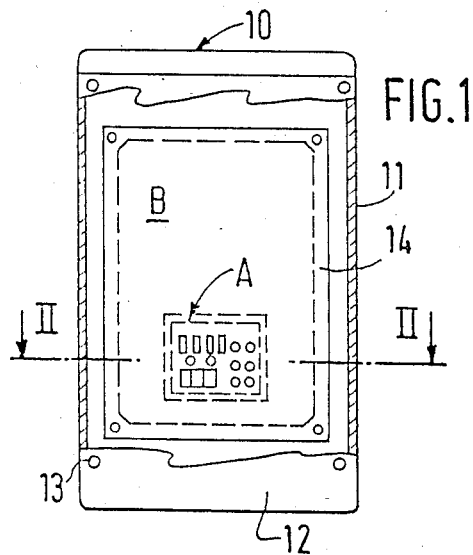
FIG. 1 shows schematically in a front elevational view a speed variator with the device of the invention.

The speed variator shown is a frequency converter associable with an asynchronous motor. Speed variator 10 has (FIG. 1) an outer case 11 with, on the front face, a removable cover 12. Cover 12, is for example, fixed to casing 11 by means of screws 13.

A printed control circuit 14 is disposed in the casing parallel to cover 12 and has, on the one hand, an area A forming the fixed support for the adjustment and dialogue device of the invention and, on the other hand, a zone B surrounding A.

Zone B serves as a support for the other components of the control circuit.

Figure 3:
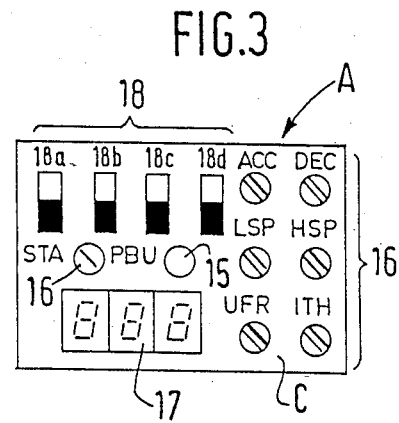
FIG. 3 shows on a larger scale the area A of the control printed circuit of the speed variator of FIG. 1.

The adjustment and dialogue zone A includes (FIG. 3) an advance knob 15 or other manual operating element allowing the operator to sequentially examine the values of the respective parameters, several potentiometers 16 for adjusting operating parameters referenced : ACC, DEC, LSP, HSP, UFR, ITH and STA and an alphanumeric display device 17 formed for example of three cells of seven segments. Zone A further includes four switches 18a–d. The function of potentiometers 16 and switches 18 will be explained further on. Zone A is protected from direct contacts by an insulating plate C fixed to the printed circuit 14 and suitably apertured so as to leave elements 15-18 visible or let them pass therethrough.

Figure 2:
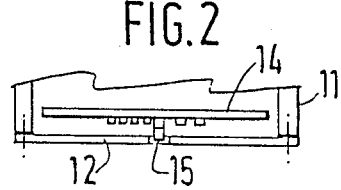
FIG. 2 shows partially the section II—II of FIG. 1

The advance knob 15 is accessible from the front of the speed variator even when cover 12 is fixed to casing 11 (FIG. 2). The display 17 is then visible through a transparent window provided in cover 12.

Elements 16, 18 can on the other hand only be manipulated after opening or removing cover 12. It is obvious that instead of this latter a removable door or cover could be provided.

Figure 4:
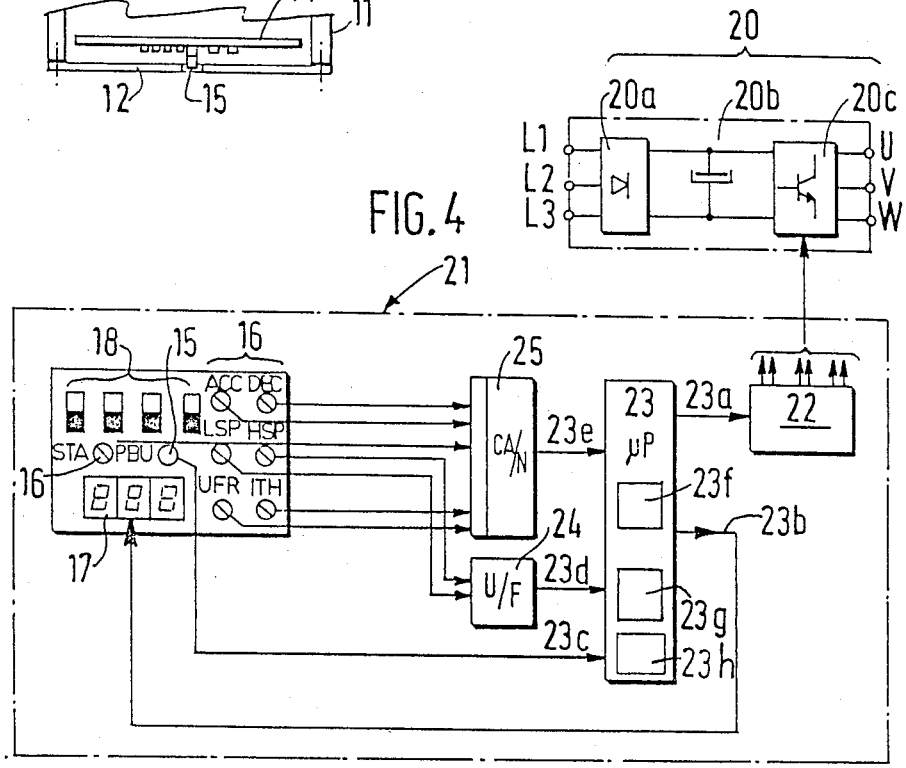
FIG. 4 is a block diagram of the speed variator.

The speed variator 10 includes (FIG. 4) a power part 20 and a control part 21, this latter being carried by the printed circuit 24.

The power part 20 has a rectifier 20a connected to conductors of the mains network L1, L2, L3, an intermediate DC voltage circuit 20b and a DC-AC converter 20c whose outputs U, V, W may be connected to the windings of the asynchronous motor. The converter 20c is a six transistor bridge whose bases are controlled by a control circuit 22 included in part 21. The disabled or enabled state of the transistors is determined by circuit 22 depending on the state of the outputs 23a of a microprocessor 23, other outputs 23b of which are connected to the display unit 17 of the adjustment and dialogue device.

The switch controlled by the advance knob 15 is connected to an input 23c of the microprocessor; the potentiometers 16 for low speed LSP and high speed HSP adjustment are connected to the inputs of a voltage-frequency converter 24 whose output is connected to an input 23d of the microprocessor; the potentiometers 16 for acceleration ACC, deceleration DEC, voltage/frequency law UFR, thermal protection of the motor ITH and stability STA adjustment are connected to the inputs of a D-A converter 25 whose outputs are connected to inputs 23e of the microprocessor.

Switch 18a allows the reference speed input to be selected, for example for a zero-20 mA sensor in one position and a 4–20 mA sensor in the other position.

Switches 18b and 18c allow the operating frequency range and the voltage/frequency law to be selected respectively.

With switch 18d, the normal operation or self test operation can be selected.

A jumper for selecting the output frequency at the rated voltage is moreover provided on the printed circuit 14.

With microprocessor 23 are associated processing equipment and software means including a means for sequential scrutinization of inputs 23d, 23e as a function of the successive actuations of the advance knob 15, as well as storage and display control means adapted for determining, as a function of the action exerted on the advance knob, the alphanumeric display at 17 of a code representative of the scrutinized parameter, then the value of this parameter.

Figure 5:
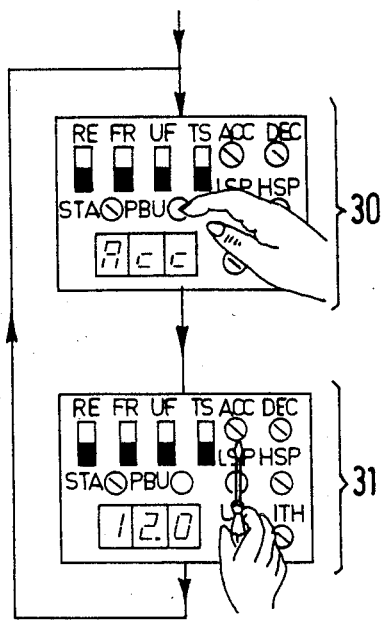
FIG. 5 shows a part of an adjustment sequence.

It can thus be seen (FIG. 5) that each display operation initiated by a pressure exerted on the advance push knob 15 includes a step 30 lasting from 0.5 to 1 second for example consisting in the display of a code of the scrutinized parameter; for instance the acceleration ramp "ACC" code; then a step 31 consisting in the display of the value of the parameter in the unit which is associated therewith. The operator effects the desired adjustment by rotating the potentiometer 16 referenced ACC by means of a screwdriver.

It should be noted that, on the one hand, the adjustment is made during operation of the variator and, on the other hand, the value displayed evolves during the adjustment, so that the operator may immediately control and improve his adjustment.

Figure 6:
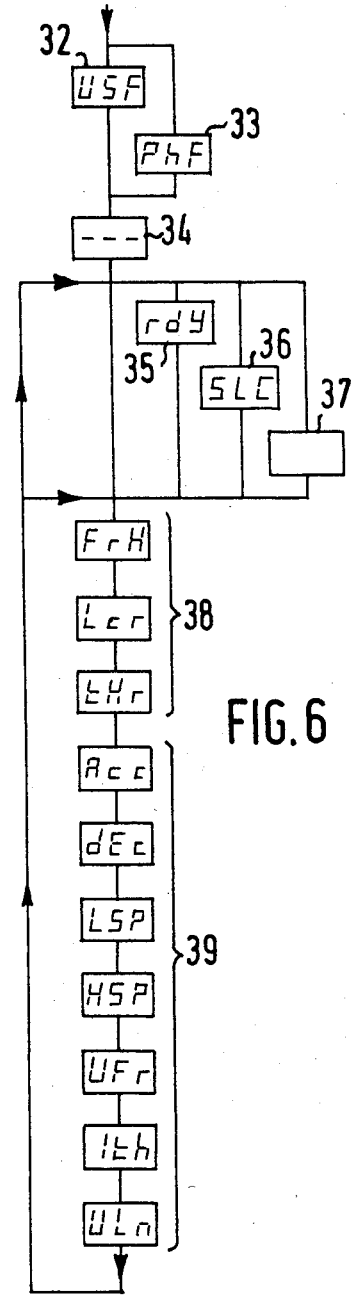
FIG. 6 shows the order of displaying the exploitation codes.

The operation of the device of the invention will now be described with reference to the process chart of FIG. 6 which shows the successive displays of the exploitation and defect codes from switching on of the variator.

As long as the mains is too low, or in the case of a temporary undervoltage, the display at 17 of the USF code 32 can be observed; if a phase voltage is absent or if there is a fleeting cut in the mains, the display of the PHF code 33 can be observed. Then code 34 indicates the capacitor charging step and the RDY code 35 appears for declaring that the variator is ready to operate. If the variator is coupled to a programmable controller by means of a series communication coupler, the SLC code 36 will be observed. The code of a possible operating defect may appear at 37.

It should be noted that the processing means comprise interrupting means 23h for causing priority display of the operating defect (for example overcurrent, overheating of the variator, overload of the motor, etc.) with respect to the display of the operating parameters and which cause the variator to stop.

When the operator presses knob 15, he causes a new operating parameter code to appear at each pressure followed by the value of this parameter.

The first code parameters 38 are parameters which are not adjustable by means of the potentiometers:
  FRH: rated frequency reference in hertz, established by an external means,
  LCR: motor current in amperes,
  HTR: thermal state of the motor in % of the rated heating of the motor.

The following code parameters 39 are parameters which are adjustable by means of the potentiometers:
  ACC: acceleration ramp in seconds,
  DEC: deceleration ramp in seconds,
  LSP: lower speed limit in hertz,
  HSP: higher speed limit in hertz,
  UFR: voltage/frequency law, linear or not,
  ITH: thermal current in amperes,
  ULH: line voltage in true volts.

A continuous pressure on knob 15 causes the cyclic scrolling of codes 35–39 ; release of knob 15 causes the display of the value of the last parameter whose code has been scrolled.

The operator who wishes to effect a diagnosis procedure acts on the self-test switch 18d and thus starts a software diagnosis sequence which allows display on unit 17 of a possible hardware defect, such as a defect on a control card, on a power card, on a power module, etc.

In a more expensive embodiment, simultaneous display of the codes 38, 39 of the operating parameter and the value of the parameter may be provided on separate display portions.

In another embodiment, an advance knob may be provided for scrolling the codes or the values of the parameters, a stepback knob for decrementing said values and a knob for selecting the scrolling mode of the codes or the adjusting mode of their values.

The invention applies to other electronic power apparatus, particularly multi-cycle controllers.

I claim:

1. In an electronic power control apparatus having a case including a removable front cover housed in said case, a controlled power supply having a plurality of adjustable operating parameters, adjusting and dialogue means comprising:
   (i) a printed circuit board mounted within said casing substantially parallel to said front cover, said circuit board having first and second surface portions and said cover having a portion facing said first surface portion and provided with an aperture ;
   (ii) a plurality of potentiometers for adjusting the respective operating parameters ;
   (iii) alphanumeric display means for displaying the adjusted values of the respective parameters ;
   (iv) switch means comprising an advance knob allowing the operator to sequentially scrutinize the respective parameters, said advance knob being accessible through said aperture, and
   (v) a processor having inputs connected to said switching means and to the potentiometers through A-D converter means and outputs connected to the display means, said processor including processing means for scrutinizing said inputs and for displaying, in response to the actuation of the advance knob, a code representative of the scrutinized parameter and the value of said parameter ;
   (vi) said parameters, display means and switch means being arranged on said first surface portion of the printed circuit board, whereas said processor and A-D convertor are arranged on the second surface portion and
   (vii) the portion of the cover which faces the display means is transparent.

2. The apparatus of claim 1, wherein self-test switch means are arranged on said first surface portion of the printed circuit board and said processing means are arranged for further displaying further codes representative of operating faults of the power control apparatus when said self-test switch means are put on.

3. The apparatus of claim 2, wherein said processing means include interrupting means for causing priority of the display of said further codes with respect to the display of said codes.

* * * * *